June 25, 1940.  S. FISCHER  2,205,648
CAMERA CABLE RELEASE
Filed June 24, 1939
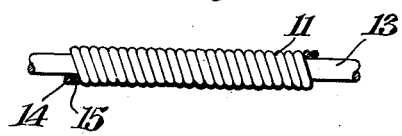
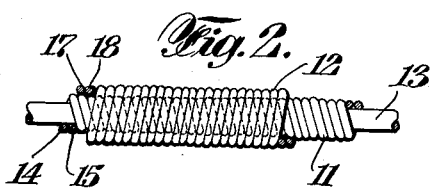
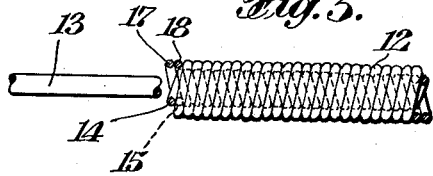 
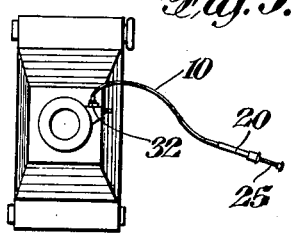
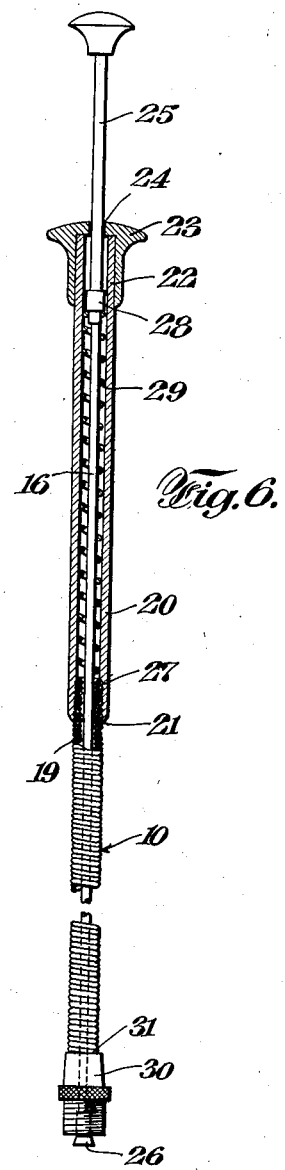
INVENTOR
*Sidney Fischer*
BY
ATTORNEY Patented June 25, 1940

2,205,648

UNITED STATES PATENT OFFICE 2,205,648

CAMERA CABLE RELEASE

Sidney Fischer, New York, N. Y., assignor of one-half to Emanuel M. Fischer, New York, N. Y.

Application June 24, 1939, Serial No. 280,946

9 Claims. (Cl. 74—502)

This invention relates to cable releases for camera shutters and particularly to the flexible casing therefor.

Difficulty has been experienced with the flexible protecting casings for the operating cable of the shutter release mechanism of cameras, in that said casings are not strong enough to withstand the stresses put thereupon and consequently are easily distorted and so damaged as to fail adequately to protect the cable causing jamming, kinking, or breakage of the cable and thereby interfering with or preventing the proper operation of the release mechanism. In cases where a long release cable is used with the camera, as for example when the photographer desires to include himself in a picture and therefore stands at a distance from the camera, the cable and casing frequently lie on the ground or floor and are not infrequently stepped upon. Flexible release cable casings heretofore used in cameras are not strong enough to withstand such abuse or other extraordinary stresses.

My invention therefore contemplates the provision of a light-weight metallic casing for the shutter release cable of cameras, said casing being of simple and inexpensive construction but of great flexibility and strength, sufficient to resist not only the normal stresses ordinarily put upon the cable but also to resist considerable abuse such as being stepped upon without damage.

My invention further contemplates the provision of a metallic cable casing of great flexibility but always returning to its initial straight form when unstressed, without permanent distortion and so constructed that it does not stretch materially and adequately resists compression.

My invention further contemplates the provision of a cable casing made of two or more layers of wire wound in opposite directions and providing a hollow interior through which the release cable is loosely threaded for easy longitudinal operation thereof without danger of jamming against the inner wall of the casing regardless of how much the cable and casing are distorted from their normal straight forms.

My invention further contemplates the provision of a simple and economical method of making my improved casing.

The various objects of the invention will be clear from the description which follows and from the drawing, in which, Fig. 1 is an elevational view of the inner layer of the cable as it appears wound upon a core as the first step in the production thereof.

Fig. 2 is a similar view of the next step whereinafter the second layer of wrapping wires is wound upon the inner layer in the opposite direction.

Fig. 3 is an elevational view of a section of the finished casing showing the core wire removed therefrom.

Fig. 4 is an end view of the casing.

Fig. 5 is a fragmentary elevational view of a camera to which a shutter release cable mechanism made in accordance with my invention has been applied.

Fig. 6 is a foreshortened elevational view, partly in section, of a shutter release cable mechanism in which my improved casing is used.

In the practical embodiment of my invention which I have shown by way of example, my improved casing, designated generally by the numeral 10, comprises two or more layers 11 and 12 of comparatively fine wire, the layer 11 being initially wound upon a preferably straight core wire 13 and the layer 12 being wound upon the layer 11.

The word "wire" throughout this specification is intended to refer to metallic wire of circular cross-section.

In producing the casing 10, I prefer to use at least two wires as 14 and 15 in winding the inner layer 11, though it will be understood that the number of wires may be increased considerably. I have found, for example, that as many as four or more adjacent wires may be used for the inner layer 11, depending upon the pitch of the helix and the degree of flexibility desired. The wires 14, 15 are tempered wires having sufficient resilience or spring so that when helically wound upon and around the core 13, said wires do not grip the core too tightly, while the wires are, nevertheless, tempered to the correct degree to enable them to substantially retain the shape into which they are wound. It will be understood that the wires 14 and 15, owing to the tempered state of said wires, slightly release the core 13 after they have been wound thereon so that when the casing is completed, the straight core may be removed without great difficulty from the interior of the layer 11, and the resulting casing is normally straight.

The diameter of each of the wrapping wires comprising the layer 11 may vary to a considerable extent but I prefer to make said diameter less than the diameter of the core 13, which in turn is greater than the diameter of the cable 16. Consequently, there is provided a sufficient space in the interior of the finished casing for the easy and smooth passage of the release cable 16 and the easy longitudinal movement of said cable within the casing. As shown in Fig. 1, the coils of the inner layer 11 are preferably wound or extended in one direction, assuming the shape of a right-hand helix. After a sufficient length of the core 13 has been wrapped with said layer 11, the outer layer 12 is superimposed on the inner layer. Said outer layer consists of a plurality of wires as 17 and 18 illustrated as two in number, but the number of said wires may be increased to four or more, if desired, depending upon the pitch and flexibility desired. The wires 17, 18 are slightly softer, that is, less resilient than the wires 14 and 15, not being tempered to the same extent as the wires of the inner layer so that said wires 17, 18 conform more closely to the shape into which they are initially wound than the wires 14, 15. The layer 12 is wound in the opposite direction from the layer 11, being illustrated in Fig. 2 as being wound in the form of a left-hand helix. The diameter of the wires of the outer layer is preferably, though not necessarily, about the same as that of the inner layer.

After both layers 11 and 12 have been suitably wrapped upon the core 13, said core is pulled out of the interior of the thus formed casing leaving the interior 19 of the casing hollow and of sufficient diameter to loosely receive the cable 16. The entire casing is then heat treated and tempered to limber the casing and to increase its flexibility to the desired extent. The casing thus formed comprises two layers of oppositely wound wires, the outer layer holding the inner layer and the inner layer supporting the outer layer in such a manner that tension put upon the casing results in no material stretch of the casing and compression, distortion, bending or other stresses put upon the casing cannot cause overlapping or riding up or uncoiling of the thus wound coils of the inner and outer layers. The casing, while extremely flexible, returns to substantially its exact straight initial form when stresses upon it are removed. It is light and much stronger and more flexible than casings heretofore in commercial use but adequately resists distortion in any direction and resists considerable abuse without danger of binding upon the cable 16. The opposite winding of the respective layers, not only prevents overlapping of the wires or coils under stress, but also prevents uncoiling of the wires.

As shown in Fig. 6, the protecting casing 10 is used in a cable release mechanism for the shutter of a camera by suitably securing the inner end of the rigid tube 20 to one end as 21 of the casing. The tube may be swaged, soldered, brazed or otherwise secured to said casing in any known manner. At the outer end 22 of the tube 20 is secured the enlarged finger piece 23 provided with an opening 24 through which the plunger 25 slides. To the inner end of the plunger is secured one end of the flexible cable 16, the other end of which carries the release operating member 26. Interposed between the end 27 of the casing and the enlargement 28 on the plunger 25 is the spring 29 serving normally to retract the member 26 and to project the plunger 25. The rigid connector 30 is provided at the end 31 of the casing 10, said connector being swaged, soldered, brazed or otherwise secured to said casing end in the same manner as the tube 20. It will be understood that the space 19 within the casing is of sufficiently large diameter to permit the cable 16 to operate smoothly and easily therein regardless of the shape into which the protecting casing and cable are bent during the operation thereof. Said cable 16 is made in the usual manner of a coiled wire so that operation of the plunger 25 toward the casing projects the release operating member 26 to operate the shutter release mechanism 32 of the camera. When the plunger 25 is released, the spring 29 operates to project the plunger and to retract the member 26, ready for repetition of the operation.

It will be seen that I have provided a cable release wherein a strong but adequately flexible protecting casing is provided, which casing is simple in construction, strong enough to withstand not only ordinary wear, but considerable abuse, and is simple and economical to construct, and thoroughly efficient for the purposes for which it is intended. It will further be seen that I have provided a simple and economical method for the production of the casing and that I have provided a structure and method well designed to meet the severe requirements of practical use.

While I have shown and described certain specific embodiments of my invention, I do not wish to be understood as limiting myself thereto, but intend to claim the invention as broadly as may be permitted by the state of the prior art and the scope of the appended claims.

I claim:

1. In a camera shutter cable release having a flexible cable, a flexible hollow metallic casing loosely enclosing the cable and being sufficiently resistant to deformation to sustain the weight of a person stepping thereon without collapsing, said casing being of comparatively light weight and consisting solely of an inner layer of a plurality of adjacent wires each of circular cross-section having helical contacting coils of one pitch and a superimposed outermost layer of a plurality of adjacent wires each of circular cross-section having helical contacting coils of reverse pitch, the pitch of the coils of one layer being substantially equal numerically to the pitch of the coils of the other layer, the layers being concentric with each other and being sufficiently resilient to maintain the casing straight when unstressed, the layers mutually contacting, supporting and reinforcing each other sufficiently to prevent overlapping and uncoiling of the layers when the casing is stressed, and the innermost diameter of the casing being substantially greater than the diameter of the cable.

2. In a camera shutter cable release having a flexible cable and having means to move the cable longitudinally, a flexible hollow metallic casing for the cable consisting solely of two helical layers each of a number of adjacent thin wires wound into contacting coils, said layers having substantially the same numerical pitch but extending in opposite directions, the wire of said layers being of circular cross-section.

3. A hollow flexible casing for the shutter release cable of a camera consisting solely of an inner layer of a plurality of wires of circular cross-section having helical coils wound of one pitch, and a layer of a plurality of wires superimposed on the inner layer and having helical coils wound of the opposite pitch, the superimposed layer contacting with and holding the inner layer against uncoiling and overlapping of the coils thereof under stress put upon the casing, the pitch of the inner layer being of substantially the same numerical value as the pitch of the outer layer.

4. A hollow flexible casing for the shutter release cable of a camera consisting solely of a plurality of concentric layers of helically wound contacting coils of wires each of circular cross-section, the coils of each layer being in contact with the preceding and succeeding coils of said layer, the wires of the innermost layer being of greater resiliency than the wires of the remaining layers, and the coils of each layer being of opposite pitch to that of the coils of the adjacent layer and in pressed contact therewith, the pitch of the respective layers being of substantially the same numerical value.

5. A hollow flexible metallic casing for the shutter release cable of a camera, said casing having no material stretch and being resistant to distortion and being straight when unstressed, said casing comprising at least two concentric layers of oppositely coiled wire, each wire being of circular cross-section, and said layers being in pressed contact along the innermost parts of one layer and the outermost parts of the other, the pitch of one layer being opposite in direction but substantially the same numerically as the pitch of the adjacent layer, and the innermost layer being core-wound.

6. In a camera shutter cable release having a flexible cable, a flexible hollow metallic casing for the cable, said casing consisting of an innermost core-wound layer of a plurality of adjacent thin wires each of circular cross-section and having adjacent coils thereof in contact with each other and a superimposed concentric layer of a plurality of adjacent thin wires of circular cross-section softer than the wires of the inner layer, the respective pitches of the layers having substantially the same numerical value but being of opposite directions, a one-piece hollow camera connector at one end of the casing, all of the layers of said one end of the casing being inserted into and directly secured to the connector, said connector having a threaded outer end, a comparatively long metallic sleeve at the other end of the casing, all of the layers of said other end of the casing being inserted into and directly secured to said long sleeve, a spring within the long sleeve abutting at one end directly against said one end of the casing and a finger operated plunger secured to the cable and slidable in the sleeve.

7. In a camera shutter cable release having a flexible cable, a flexible hollow metallic casing for the cable, said casing consisting solely of two concentric layers of helically coiled wire, said wire being of circular cross-section, the adjacent coils of each layer being in mutually contacting relation, the pitch of said layers being numerically approximately the same but of opposite directions, a one-piece camera-connecting member through which one end of the cable passes, said member being threaded at one end and at its other end receiving both layers of one end of the casing therein, a sleeve receiving both layers of the other end of the casing therein, and a spring pressed operating member at the other end of the cable.

8. In a camera shutter cable release having a flexible cable, a flexible hollow metallic casing for the cable of uniform diameter from end to end, said casing consisting solely of wires of circular cross-section arranged in concentric layers, each layer consisting of helical contacting coils, the pitch of the coils of adjacent layers being substantially the same numerically but of opposite directions, a sleeve having an inner diameter substantially equal to the outermost diameter of the casing and receiving a short portion of the end part of the casing and swaged thereto, and a one-piece connector at the other end of the casing receiving a short portion of said other end part of the casing and swaged thereto, said connector being threaded for detachable connection to a camera shutter.

9. In a camera shutter cable release having a flexible cable, a flexible hollow metallic casing for the cable, said casing consisting of two layers each of a plurality of helically coiled wires of circular cross-section, the coils of each layer contacting with the preceding and succeeding coils of the layer, the pitch of the coils of one layer being approximately equal in numerical value to the pitch of the coils of the other layer but opposite in direction, the inner layer being core-wound, a first sleeve directly secured to one end of the casing, a second sleeve directly secured to the other end of the casing, and a spring in the first sleeve and around the cable directly abutting against said end of the casing, said cable entering said one sleeve to a substantial extent and passing through the second sleeve.

SIDNEY FISCHER.